No. 635,712. Patented Oct. 24, 1899.
G. M. CLARK.
DISK PLOW.
(Application filed Dec. 12, 1898.)
(No Model.) 2 Sheets—Sheet 1.
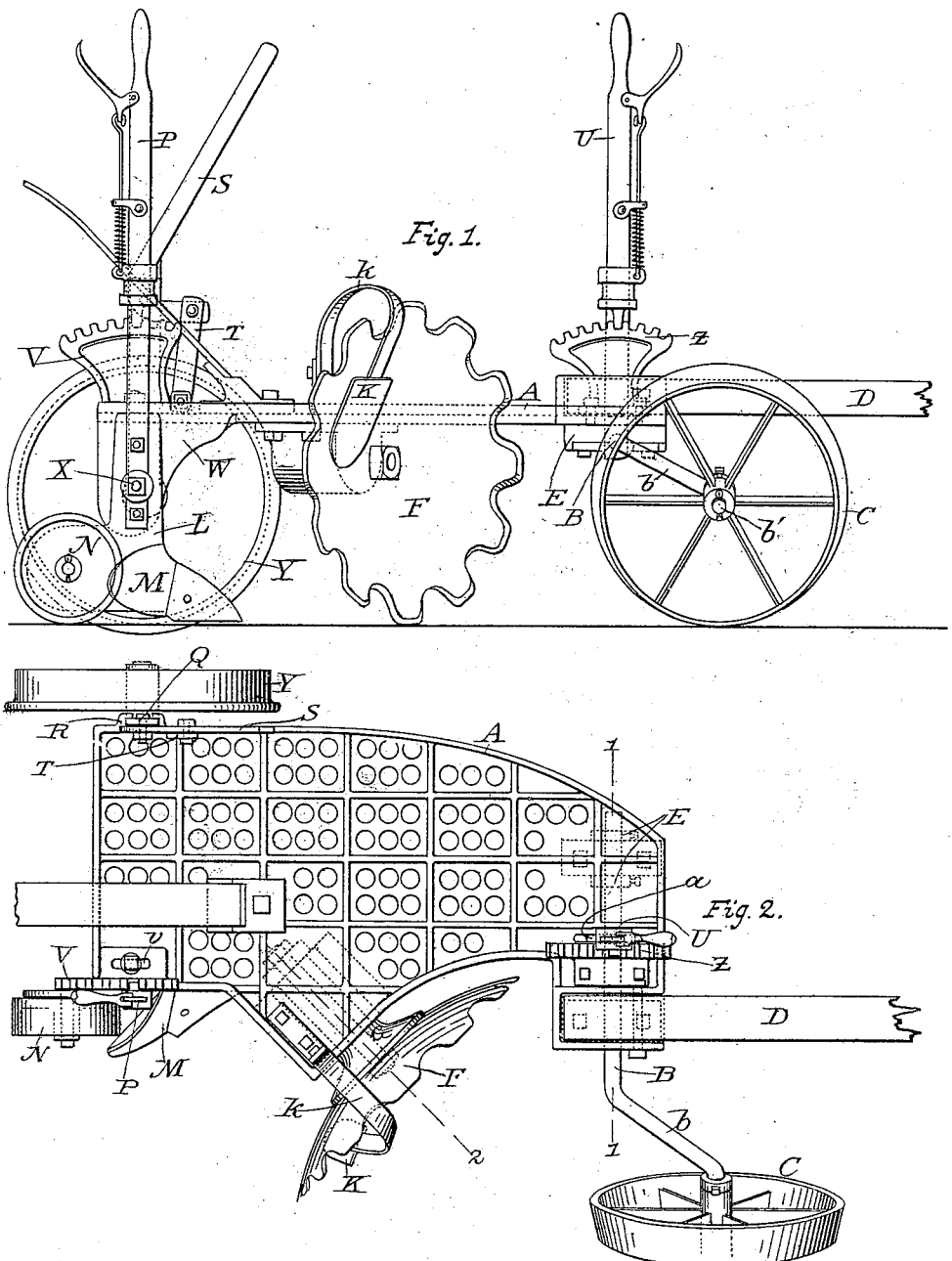
Witnesses,
George M. Clark,
Inventor
Attorney.

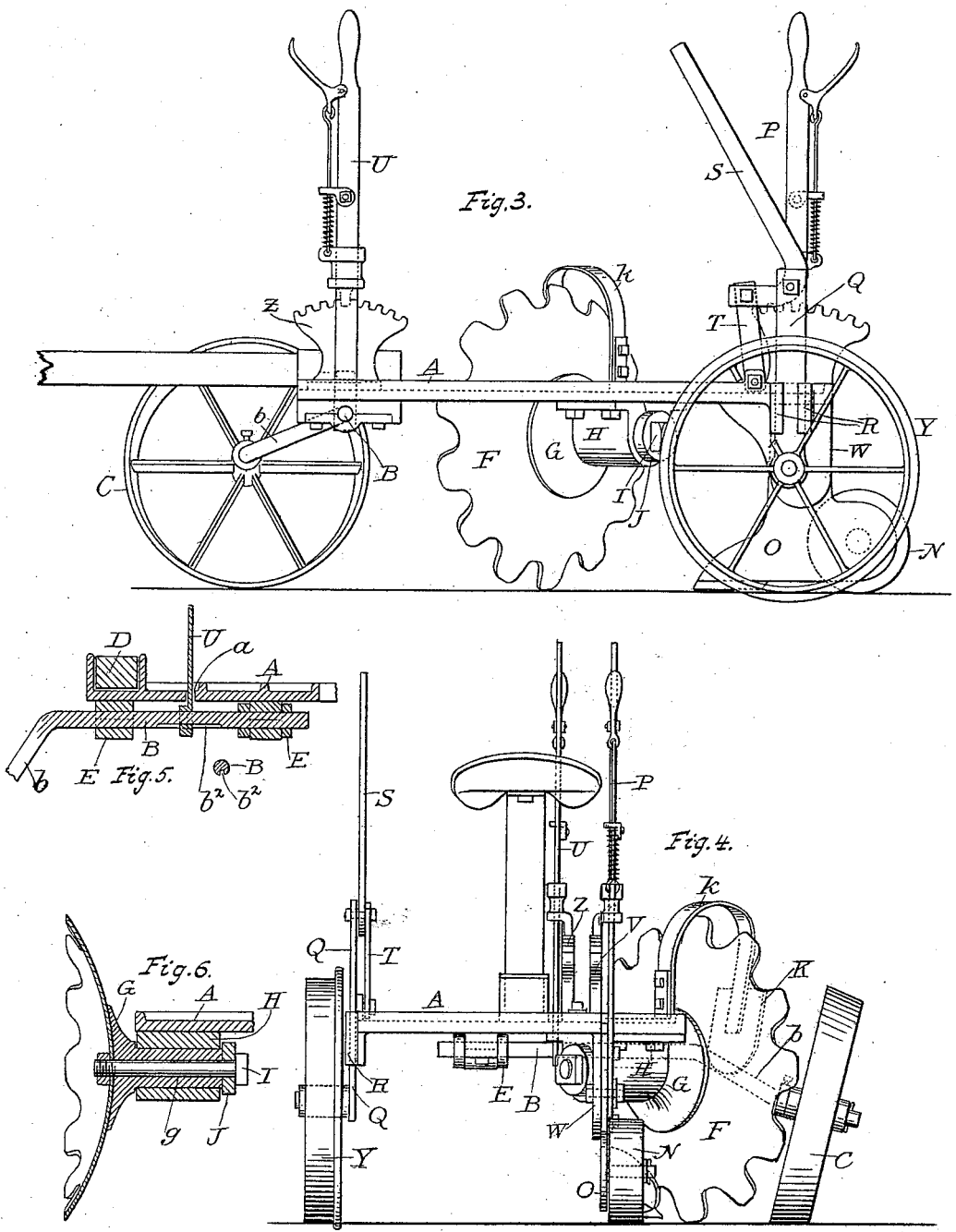

UNITED STATES PATENT OFFICE.

GEORGE MARSHALL CLARK, OF HIGGANUM, CONNECTICUT, ASSIGNOR TO ELMER S. HUBBARD, OF MIDDLETOWN, CONNECTICUT.

DISK PLOW.

SPECIFICATION forming part of Letters Patent No. 635,712, dated October 24, 1899.

Application filed December 12, 1898. Serial No. 699,082. (No model.)

*To all whom it may concern:*

Be it known that I, GEORGE MARSHALL CLARK, a citizen of the United States, residing at Higganum, in the county of Middlesex and State of Connecticut, have invented certain new and useful Improvements in Disk Plows; and I do hereby declare the following to be a full, clear, and exact description of the invention, such as will enable others skilled in the art to which it appertains to make and use the same.

My invention has for its object to provide a disk plow which shall be strong and simple in construction and effective and durable in operation. This I accomplish by the means illustrated in the accompanying drawings, in which—

Figure 1 is a side view of a disk plow embodying my invention. Fig. 2 is a plan view of the same. Fig. 3 is a reverse side view of the parts shown in Fig. 1. Fig. 4 is an end view of a disk plow embodying my device. Fig. 5 is a vertical section taken on line 1 of Fig. 2. Fig. 6 is a vertical section taken on line 2 of Fig. 2.

As illustrated in the drawings, A represents a main frame having its forward end supported on an axle B, which is journaled in bearing-boxes E, secured to the main frame. The outer end of the axle B is bent, as indicated by $b$, and the extreme end $b'$ of said axle extends outward from the arm $b$ and is journaled in the hub of the furrow-wheel C. A lever U is secured to the axle B and extends through a slot $a$ in the main frame. This lever is provided with a spring-latch which engages a toothed sector Z, mounted upon the main frame. The axle B is provided with a slot $b^2$, in which an ordinary key may be driven to secure the lever to the axle and permit the lever to remain in a fixed position relatively to the main frame while the axle is moved bodily inward or outward in the direction of its length, so as to adjust the furrow-wheel C at the desired distance from the main frame, and thereby regulate the width of furrow desired. A revolving disk F, having its periphery preferably cut away in part, is secured to the main frame A and arranged obliquely to the line of draft. A circular flange G bears against the back of the disk F and is provided with a hub $g$, which is journaled in a bearing H, secured to the main frame. A washer J, having a diameter greater than that of the hub $g$, bears against the end of said hub. A bolt I extends through said disk, flange, hub, and washer and is provided on its threaded outer end with an engaging nut, by means of which said parts are clamped firmly together and the hub $g$ is held in said bearing H.

The rear end of the plow is supported on one side by a land-wheel Y, pivoted upon a standard Q. This standard moves or slides vertically in ways R, formed on or attached to the side of the main frame. A bent lever S is pivoted to the upper end of the vertical standard Q, and the bent end of such lever is connected with the main frame by means of a link T, which is pivoted to said bent lever and to the main frame. The opposite side of the rear end of the main frame is provided with a hanger or bracket W, to which an arm L is pivoted at X. A lever P is rigidly secured to said arm or standard L, and is provided with a spring-latch engaging a toothed sector V. This sector V is provided on its lower end with a horizontal flange having a slot $v$, by means of which the position of the segment V may be adjusted. The lower end of the arm or standard L is provided with a flange O, which serves as the landside of a plow M, formed on or secured to the outside of said flange O. A caster-wheel N is journaled upon the rear end of the flange O and serves as a support for one end of the main frame when desired. A scraper K is arranged against or in close proximity to the face of the disk F and is mounted upon a spring-arm $k$, which holds said scraper at the desired position in contact with such disk.

When the parts are in operation, the height of the forward end of the main frame relative to the furrow-wheel C is regulated by moving the lever U. This lever in turn rotates the axle B and raises or depresses the bent end of said axle. The rear end of the main frame is raised or lowered relatively to the land-wheel Y by bending forward or backward the lever S. When such lever is moved forward to nearly a horizontal position, the link L is brought nearly in line with the bent portion of such lever, and the main frame is thereby lowered relatively to the axis of the wheel Y.

When said lever S is arranged in a horizontal position backward, however, it draws the main frame upward relatively to the axis of such wheel Y. When it is desired to support one end of the main frame by means of the caster-wheel N, the lever P is moved backward until such wheel N comes in contact with the ground. At such time the point of the plow M is raised out of the ground and is inclined upward. When the plow is working in the ground, however, the lever P is thrown forward, so as to incline the point of the plow M downward to a slight degree, and thereby enable said plow to operate in the ground. The plow M is arranged to follow in the path of the disk F and trim the edge of the land left by said disk. The edge of the land left uncut by the disk is curved from the surface of the land down to the furrow, and the plow M cuts away such curved portion, leaving a straight edge, by means of which the following strip of earth may be more readily turned over on its face and the ground thereby more thoroughly cultivated.

When the plow-point is constructed of chilled metal, it wears away after considerable use, and to compensate for such wear of the plow-point the sector V is provided with the slot $v$, (shown in Fig. 2,) so that such sector may be moved forward to compensate for such wearing away of the point of the plow, and the spring-latch of the lever P will thereby always occupy the same notch of the sector when the plow-point is inclined to a particular degree.

I do not desire to be limited to the particular means herein shown for trimming the edge of the soil left by the disk, and in some instances I propose to use a knife or cutter secured to a pivoted arm arranged in rear of the revolving disk instead of the plow M.

What I claim as new, and desire to secure by Letters Patent, is—

1. In a disk plow, the combination with a main frame, of a revolving disk secured thereto, a vertical flange serving as a landside pivoted to said frame and provided with a plow-point and moldboard, a lever connected with said flange, and a caster journaled on said landside, whereby said plow-point may be moved in the arc of a circle and said caster raised from or brought in contact with the ground as desired, substantially as shown and described.

2. In a disk plow, the combination with a main frame of a furrow-wheel mounted upon a bent axle having a lever secured thereto, a land-wheel mounted upon a vertical standard provided with a vertically-sliding connection with said main frame, a lever pivoted to the upper end of said standard and provided with a bent end, and a link pivoted to the main frame and the bent end of said lever, substantially as shown and described.

3. In a disk plow, the combination with a main frame, of a furrow-wheel mounted upon a bent axle having an adjusting-lever secured thereto, a land-wheel mounted upon a vertical standard having a sliding connection with said main frame, a bent lever pivoted to the upper end of said standard, a link pivoted to the main frame and to the bent end of said lever, and a lever pivoted to the main frame and provided with a pivoted caster a moldboard and plow-point, substantially as shown and described.

4. In a disk plow, the combination with a main frame, of a lever pivoted to said main frame and provided on its lower end with a vertical flange, a caster, a plow-point and moldboard, and a notched sector adjustably secured to the main frame adjacent to said lever, substantially as shown and described.

In testimony whereof I affix my signature in presence of two witnesses.

GEORGE MARSHALL CLARK.

Witnesses:
PAUL M. WEBER,
CLEMENT S. HUBBARD.